(12) United States Patent
Shirata

(10) Patent No.: US 10,102,874 B2
(45) Date of Patent: Oct. 16, 2018

(54) METHOD OF MANUFACTURING HEXAGONAL FERRITE POWDER, HEXAGONAL FERRITE POWDER, AND MAGNETIC RECORDING MEDIUM

(71) Applicant: FUJIFILM Corporation, Tokyo (JP)

(72) Inventor: Masashi Shirata, Minami-ashigara-shi (JP)

(73) Assignee: FUJIFILM Corporation, Tokyo (JP)

( * ) Notice: Subject to any disclaimer, the term of this patent is extended or adjusted under 35 U.S.C. 154(b) by 674 days.

(21) Appl. No.: 14/671,125

(22) Filed: Mar. 27, 2015

(65) Prior Publication Data

US 2015/0279406 A1 Oct. 1, 2015

(30) Foreign Application Priority Data

Mar. 28, 2014 (JP) ................. 2014-070565

(51) Int. Cl.
| | |
|---|---|
| *H01F 1/10* | (2006.01) |
| *G11B 5/714* | (2006.01) |
| *G11B 5/706* | (2006.01) |
| *C01G 49/00* | (2006.01) |
| *H01F 1/11* | (2006.01) |

(52) U.S. Cl.
CPC ...... *G11B 5/70678* (2013.01); *C01G 49/0018* (2013.01); *C01G 49/0036* (2013.01); *H01F 1/11* (2013.01); *C01P 2004/51* (2013.01); *C01P 2004/64* (2013.01); *C01P 2006/42* (2013.01); *Y10T 428/2982* (2015.01)

(58) Field of Classification Search
CPC .... C01P 2006/42; H01F 1/11; C01G 49/0036; C01G 49/0018
See application file for complete search history.

(56) References Cited

U.S. PATENT DOCUMENTS

| | | | |
|---|---|---|---|
| 4,789,494 A * | 12/1988 | Aoki .................. | C01G 49/0018 252/62.56 |
| 9,454,983 B2 * | 9/2016 | Hosoya .............. | C01G 49/0036 |
| 2009/0085002 A1 | 4/2009 | Omura et al. | |

FOREIGN PATENT DOCUMENTS

| | | |
|---|---|---|
| JP | 2005-532897 A | 11/2005 |
| JP | 2009-088293 A | 4/2009 |
| JP | 2009-208969 A | 9/2009 |
| WO | 2004/007350 A1 | 1/2004 |
| WO | WO 2004/007350 * | 1/2004 |

OTHER PUBLICATIONS

Office Action dated Mar. 15, 2016, issued by the Japan Patent Office in corresponding Japanese Application No. 2014-070565.

* cited by examiner

Primary Examiner — C Melissa Koslow
(74) Attorney, Agent, or Firm — Sughrue Mion, PLLC

(57) ABSTRACT

An aspect of the present invention relates to A method of manufacturing hexagonal ferrite powder, which comprises heating to equal to or higher than 300° C. and pressurizing to equal to or higher than 20 MPa a hexagonal ferrite precursor-containing water-based solution, to convert the precursor to hexagonal ferrite, wherein the water-based solution comprises at least a reducing compound selected from the group consisting of a reducing inorganic compound and a reducing organic compound that have a reducing property and exist as a solid or a liquid at ordinary temperature and ordinary pressure, as well as, when the reducing compound is a reducing inorganic compound, the water-based solution further comprises an organic compound.

14 Claims, 1 Drawing Sheet

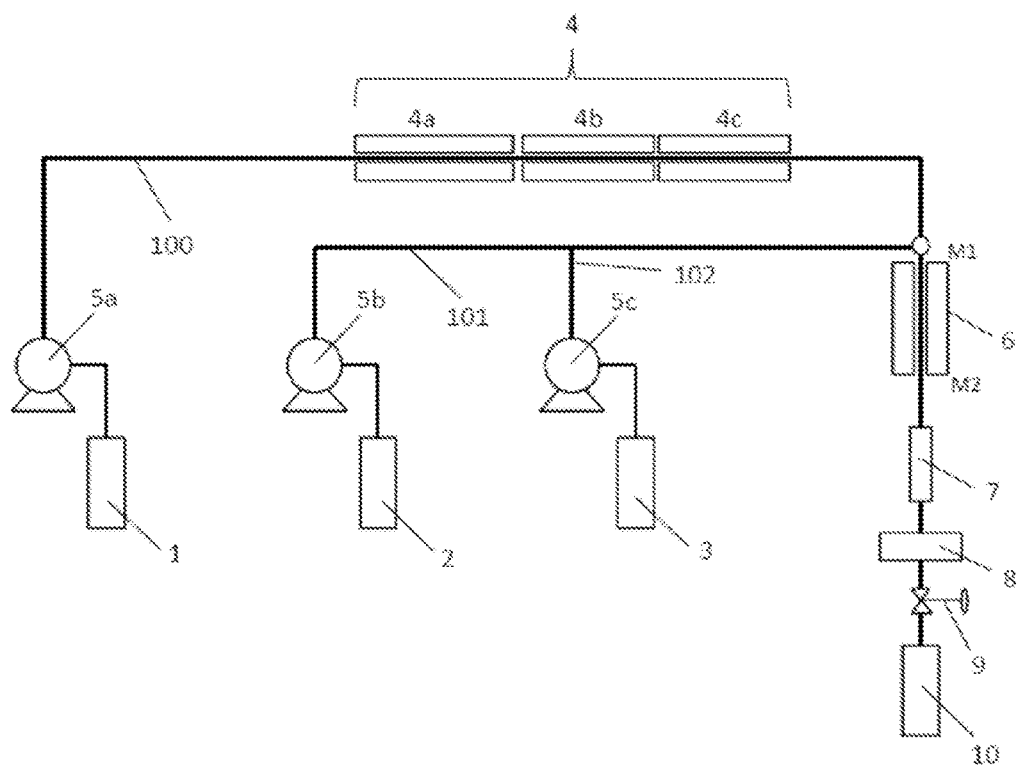

METHOD OF MANUFACTURING HEXAGONAL FERRITE POWDER, HEXAGONAL FERRITE POWDER, AND MAGNETIC RECORDING MEDIUM

CROSS-REFERENCE TO RELATED APPLICATIONS

This application claims priority under 35 U.S.C 119 to Japanese Patent Application No. 2014-070565 filed on Mar. 28, 2014. The above application is hereby expressly incorporated by reference, in its entirety.

BACKGROUND OF THE INVENTION

Field of the Invention

The present invention relates to a method of manufacturing hexagonal ferrite powder, hexagonal ferrite powder, and a magnetic recording medium Discussion of the Background Hexagonal ferrite powder is widely employed as ferromagnetic powder contained in a magnetic layer of magnetic recording media. The coercive force thereof is great enough for use in permanent magnetic materials. The magnetic anisotropy that is the basis of the coercive force derives from its crystal structure. Thus, high coercive force can be maintained even when the size of the particles is reduced. Further, magnetic recording media employing hexagonal ferrite in a magnetic layer have high density characteristics due to the vertical component. Thus, hexagonal ferrite is ferromagnetic powder that is suited to high density recording.

Various methods of manufacturing hexagonal ferrite have been proposed, including the coprecipitation method, the hydrothermal synthesis method, and the glass crystallization method. Of these, manufacturing methods utilizing a hydrothermal synthesis reaction (referred to as a hydrothermal synthesis process, hereinafter) in the presence of a high-temperature, high-pressure water such as supercritical water and subcritical water have been garnering attention in recent years as methods permitting the manufacturing of hexagonal ferrite with high productivity (for example, see Japanese Unexamined Patent Publication (KOKAI) No. 2009-208969, which is expressly incorporated herein by reference in its entirety).

SUMMARY OF THE INVENTION

In the field of magnetic recording, there is a need to reduce the particle size of the ferromagnetic powder that is contained in the magnetic layer to decrease noise and increase the fill rate of the magnetic layer.

With regard to magnetic characteristics, a magnetic recording medium comprising ferromagnetic powder of high saturation magnetization (as) can exhibit high output, and thus achieve a higher signal-to-noise ratio (SNR). Accordingly, it is desirable to increase the saturation magnetization of hexagonal ferrite powder from the perspective of achieving a magnetic recording medium capable of achieving a high SNR.

In this regard, Japanese Unexamined Patent Publication (KOKAI) No. 2009-208969 proposes placing an organic molecule undergoing a hydrothermal synthesis reaction in the presence of supercritical water or subcritical water to control the size and the like of barium hexaferrite, one type of hexagonal ferrite powder. However, in Japanese Unexamined Patent Publication (KOKAI) No. 2009-208969, the barium hexaferrite that is obtained in Examples of Japanese Unexamined Patent Publication (KOKAI) No. 2009-208969 is described as having a lower saturation magnetization than that manufactured by previously reported manufacturing methods. Further, in Japanese Unexamined Patent Publication (KOKAI) No. 2009-208969, the reason for this is stated to be that when the particle size is reduced, the saturation magnetization also decreases in parallel, and that this is a generally known phenomenon (see paragraph 0040 of Japanese Unexamined Patent Publication (KOKAI) No. 2009-208969).

As set forth above, achieving both enhanced saturation magnetization and reduced particle size in hexagonal ferrite powder has conventionally been difficult.

An aspect of the present invention provides for a means of achieving both enhanced saturation magnetization and reduced particle size in hexagonal ferrite powder.

The above hydrothermal synthesis process is a method of manufacturing hexagonal ferrite by placing a hexagonal ferrite precursor in the presence of highly reactive water that has been heated and pressurized, thereby converting it to hexagonal ferrite. The present inventor conducted extensive research into this hydrothermal synthesis process, resulting in the new discovery that in the reaction converting the precursor into hexagonal ferrite, by either ensuring the presence of a reducing organic compound or ensuring the presence of an organic compound (regardless of whether or not a reducing compound) and a reducing inorganic compound, it was possible to achieve both enhanced saturation magnetization and a reduction in the size of the hexagonal ferrite powder.

Although merely presumed by the present inventor and not to be construed as limiting the present invention in any fashion, the present inventor subsequently considered that the reducing compound played the role of promoting the reaction that converted the precursor into hexagonal ferrite. This point is presumed to contribute to enhancing the saturation magnetization of the hexagonal ferrite. More specifically, the reducing compound has been presumed by the present inventor to contribute to enhancing the saturation magnetization by yielding highly crystalline hexagonal ferrite by promoting the reaction converting the precursor into hexagonal ferrite.

Additionally, the fact that the reducing compound can rapidly advance the reaction by promoting the reaction that converts the precursor into hexagonal ferrite is presumed to contribute to reducing the size of the hexagonal ferrite obtained. Still further, the fact that the use of a reducing compound can accelerate the reaction that converts the precursor into hexagonal ferrite is also thought to be desirable by the present inventor from the perspective of obtaining hexagonal ferrite with little variation in particle size (good uniformity of particle size). In addition, it has also become clear based on the results of research conducted by the present inventor that, in order to achieve an adequate reduction in particle size, there is a need to employ an organic compound in combination with a reducing compound when the reducing compound is an inorganic compound.

The present invention was devised based on these discoveries.

An aspect of the present invention relates to a method of manufacturing hexagonal ferrite powder, which comprises:

heating to equal to or higher than 300° C. and pressurizing to equal to or higher than 20 MPa a hexagonal ferrite precursor-containing water-based solution, to convert the precursor to hexagonal ferrite;

wherein the water-based solution comprises at least a reducing compound selected from the group consisting of a reducing inorganic compound and a reducing organic compound that have a reducing property and exist as a solid or a liquid at ordinary temperature and ordinary pressure, as well as, when the reducing compound is a reducing inorganic compound, the water-based solution further comprises an organic compound.

In this context, the above phrase "exist as a solid or a liquid at ordinary temperature and ordinary pressure" means that they exist as a solid or a liquid at least at 25° C. and one atmospheric pressure (about 1,013.25 hPa), and includes the case of existence in a mixed state of both solid and liquid. The term "reducing" means having either, or both, the ability to add a hydrogen atom to another compound or/and the ability to donate an electron to another compound. Specific details about reducing compounds will be given further below.

In an embodiment, the above manufacturing method further comprises mixing an iron salt, a divalent metal salt, the reducing compound, and a base in a water-based solvent to prepare a precursor solution comprising a hexagonal ferrite precursor and the reducing compound.

In an embodiment, in the mixing, the reducing compound is mixed in an amount ranging from 2 mole parts to 300 mole parts per 100 mole parts of a combined amount of the iron salt and the divalent metal salt.

In an embodiment, the reducing compound comprises at least a reducing organic compound that has a reducing property and exists as a solid or a liquid at ordinary temperature and ordinary pressure.

In an embodiment, the reducing compound comprises at least a reducing inorganic compound that has a reducing property and exists as a solid or a liquid at ordinary temperature and ordinary pressure.

In an embodiment, the reducing compound comprises at least a hydrazine compound.

In an embodiment, the hydrazine compound is hydrazine.

In an embodiment, the reducing compound comprises at least an amine compound.

In an embodiment, the amine compound is triethylamine.

In an embodiment, the amine compound is triethanolamine.

In an embodiment, the above manufacturing method further comprises mixing the precursor solution that has been prepared with an organic compound solution containing an organic compound.

In an embodiment, the organic compound is selected from the group consisting of an organic carboxylic acid and a salt thereof.

In an embodiment, in the above manufacturing method, a flow passage continuously feeding the precursor solution and a flow passage continuously feeding the organic compound solution are converged to mix the precursor solution and organic compound solution.

In an embodiment, in the above manufacturing method, a mixed solution of the precursor solution and organic compound solution is mixed with water that has been heated and pressurized, and then fed to a reaction flow passage within which a fluid flowing therein is subjected to heating to equal to or higher than 300° C. and pressurizing to equal to or higher than 20 MPa to convert the precursor to hexagonal ferrite.

In an embodiment, in the above manufacturing method, the flow passage within which the mixed solution is being continuously fed and a flow passage within which heated and pressurized water is being continuously fed are converged to mix the mixed solution with heated and pressurized water.

In an embodiment, the hexagonal ferrite that is obtained by the conversion of the precursor is selected from the group consisting of barium ferrite, strontium ferrite, and a mixed crystal thereof.

A further aspect of the present invention relates to hexagonal ferrite powder manufactured by the above manufacturing method.

In an embodiment, the above hexagonal ferrite powder has an average particle size ranging from 10 nm to 50 nm and has a saturation magnetization ranging from 40 A·m$^2$/kg to 70 A·m$^2$/kg.

In an embodiment, the above hexagonal ferrite powder has a coefficient of variation in particle size of 5% to 40%.

A further aspect of the present invention relates to a magnetic recording medium, which comprises a magnetic layer comprising ferromagnetic powder and binder on a nonmagnetic support, wherein the ferromagnetic powder is the above hexagonal ferrite powder.

An aspect of the present invention can provide hexagonal ferrite powder of small particle size and high saturation magnetization.

A further aspect of the present invention can provide a magnetic recording medium having a magnetic layer comprising the above hexagonal ferrite powder and exhibiting a high SNR.

Other exemplary embodiments and advantages of the present invention may be ascertained by reviewing the present disclosure and the accompanying drawings.

BRIEF DESCRIPTION OF THE DRAWINGS

The present invention will be described in the following text by the exemplary, non-limiting embodiments shown in the drawing, wherein:

FIG. 1 is a schematic descriptive drawing of an example of a manufacturing device suited to the hydrothermal synthesis process.

DETAILED DESCRIPTION OF THE EMBODIMENTS

Unless otherwise stated, a reference to a compound or component includes the compound or component by itself, as well as in combination with other compounds or components, such as mixtures of compounds.

As used herein, the singular forms "a," "an," and "the" include the plural reference unless the context clearly dictates otherwise.

Except where otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not to be considered as an attempt to limit the application of the doctrine of equivalents to the scope of the claims, each numerical parameter should be construed in light of the number of significant digits and ordinary rounding conventions.

Additionally, the recitation of numerical ranges within this specification is considered to be a disclosure of all numerical values and ranges within that range. For example, if a range is from about 1 to about 50, it is deemed to include, for example, 1, 7, 34, 46.1, 23.7, or any other value or range within the range.

The following preferred specific embodiments are, therefore, to be construed as merely illustrative, and non-limiting to the remainder of the disclosure in any way whatsoever. In this regard, no attempt is made to show structural details of the present invention in more detail than is necessary for fundamental understanding of the present invention; the description taken with the drawings making apparent to those skilled in the art how several forms of the present invention may be embodied in practice.

Method of Manufacturing Hexagonal Ferrite Powder

An aspect of the present invention relates to a method of manufacturing hexagonal ferrite powder, which comprises:

heating to equal to or higher than 300° C. and pressurizing to equal to or higher than 20 MPa a hexagonal ferrite precursor (also referred to as a "precursor", hereinafter)-containing water-based solution, to convert the precursor to hexagonal ferrite;

wherein the water-based solution comprises at least a reducing compound selected from the group consisting of a reducing inorganic compound and a reducing organic compound that have a reducing property and exist as a solid or a liquid at ordinary temperature and ordinary pressure, as well as, when the reducing compound is a reducing inorganic compound, the water-based solution further comprises an organic compound.

The reasons the above manufacturing method can yield hexagonal ferrite powder of small particle size and high saturation magnetization are as set forth above. The water-based solution that is heated and pressurized is contained along with the reducing organic compound, or with an organic compound (regardless of whether or not a reducing compound) and a reducing inorganic compound. These compounds can be mixed with the starting materials of the precursor during preparation of the hexagonal ferrite precursor. Alternatively, they can be mixed with the precursor following preparation of the precursor. Still further, they can be both mixed with the starting materials of the precursor and mixed with the prepared precursor.

The above manufacturing method will be described in greater detail below.

<Preparation of Hexagonal Ferrite Precursor>

(i) Starting Materials (Iron Salt, Divalent Metal Salt), Base, Water-based Solvent It suffices for the hexagonal ferrite precursor to be a compound that is converted into ferrite (ferrite conversion) when placed in the presence of high-temperature, high-pressure water. The term "high-temperature, high-pressure water" refers to water that has been heated and pressurized. The details will be given further below. The precursor can be one that exhibits high solubility in water and dissolves in a water-based solvent, described further below, or one that has poor solubility in water but will disperse (in sol form) as colloidal particles in a water-based solvent.

Magnetoplumbite-type (M-type), W-type, Y-type, and Z-type crystalline structures of hexagonal ferrite are known. Hexagonal ferrite of any crystalline structure can be obtained by the above manufacturing method. For example, M-type hexagonal ferrite containing no substitution atoms is a metal oxide denoted by $AFe_{12}O_{19}$. A denotes a divalent metal atom. The term "divalent metal atom" refers to a metal atom that can become an ion in the form of a divalent cation, including alkaline earth metal atoms, salts, and the like such as barium, strontium, and calcium. A portion of the divalent metal atoms in the hexagonal ferrite can be substituted with substitution atoms. When obtaining such hexagonal ferrite, it is possible to employ a divalent metal salt and a salt containing a substitution atom in combination. Examples of substitution atoms that can substitute for the divalent atom can be optional atoms set forth below, but this is not a limitation.

The precursor of hexagonal ferrite set forth above can be obtained by mixing an iron salt and a divalent metal salt in a water-based solution containing a base. Normally, a salt comprising iron atoms and divalent metal atoms (such as a hydroxide) will precipitate out into the water-based solution in the form of particles, desirably colloidal particles. These particles that precipitate out can subsequently be placed in the presence of high-temperature, high-pressure water to achieve ferrite conversion and obtain hexagonal ferrite.

Salts of alkaline earth metals such as barium, strontium, and calcium, and lead salts can be used as the divalent metal salt. The type of divalent metal atom can be determined based on the hexagonal ferrite that is desired. For example, when obtaining barium ferrite is desirable, barium salt can be employed as the divalent metal salt. When obtaining strontium ferrite is desirable, strontium salt can be employed. When obtaining mixed crystals of barium ferrite and strontium ferrite is desirable, a barium salt and a strontium salt can be employed in combination as the divalent metal salt. A water-soluble salt is desirable as the salt. For example, hydroxides; halides such as chlorides, bromides, and iodides; and nitrates can be employed. Hydrates can also be employed.

Water-soluble salts of iron, such as halides such as chlorides, bromides, and iodides; nitrates; sulfates; carbonates; organic acid salts; and complexes can be employed as the iron salt. Hydrates can also be employed. The blending ratio and amounts added of the iron salt and divalent metal salt can be determined in accordance with the desired ferrite composition. In addition to an iron salt and a divalent metal salt, salts of optional atoms that are capable of constituting hexagonal ferrite along with iron atoms and divalent metal atoms can also be added. Examples of such optional atoms are Nb, Co, Ti, and Zn. The amounts of salts of these optional atoms that are added can be determined in accordance with the desired ferrite composition.

The above-described salts are mixed with a water-based solvent containing a base to cause hexagonal ferrite precursor containing the atoms contained in these salts to precipitate. It is thought that hydroxide ions ($OH^-$) in the water-based solvent containing the base mainly form a hydroxide sol with the iron ions contained in the iron salt and the divalent metal ions contained in the divalent metal salt, thereby forming the precursor. The precursor that precipitates out here is subsequently converted to hexagonal ferrite (ferrite conversion).

The term "base" as used in the present invention refers to one or more base as per the definition of Arrhenius, Bronsted, or Lewis (Arrhenius bases, Bronsted bases, or Lewis bases).

Specific examples of bases are sodium hydroxide, potassium hydroxide, sodium carbonate, and ammonia water, but there is no limitation thereto. Nor is there any limitation to inorganic bases; organic bases can also be employed. In the above manufacturing method, the water-based solution for preparing the precursor contains a base. However, since some of the salts added along with the base may exhibit acidity, the pH of the water-based solution is not limited to being basic and will sometimes be neutral or acidic. The pH of the water-based solution as the pH at the liquid temperature during precursor preparation (during the reaction), ranges from 4 to 14, for example. From the perspective of promoting the reaction to prepare the precursor, 5 to 14 is desirable, 6 to 13 is preferred, and 6 to 12 is of greater preference. A pH of equal to or higher than 7, or higher than 7 (neutral to basic) is of still greater preference. The temperature of the water-based solution during the reaction can be controlled by heating or cooling, or can be room temperature without temperature regulation. The solution temperature desirably falls within a range of 10° C. to 90° C. The reaction can be adequately conducted without temperature regulation (for example, at about 20° C. to 25° C.). For temperature regulation, the batch-type reaction tank and continuous-type reaction tank, described further below, can be equipped with heating means and cooling means.

The water-based solvent refers to a solvent that contains water, water alone, or to a mixed solvent of water and an organic solvent. The water-based solvent desirably comprises equal to or more than 50 weight percent of water, and is preferably water alone.

An organic solvent that is miscible with water or hydrophilic is desirable as the organic solvent that can be used in combination with water in the water-based solvent. From this perspective, polar solvents are suitably employed. In this context, the term "polar solvent" refers to a solvent with a dielectric constant of equal to or higher than 15, with a solubility parameter of equal to or higher than 8, or both. Examples of desirable organic solvents are alcohols, ketones, aldehydes, nitriles, lactams, oximes, amides, ureas, amines, sulfides, sulfoxides, phosphoric acid esters, carboxylic acids, and carboxylic acid derivatives in the form of esters, carbonic acid, carbonic acid esters, and ethers.

The water-based solution that contains the precursor prepared as set forth above and that has been heated to equal to or higher than 300° C. and pressurized to equal to or higher than 20 MPa as set forth above contains a least a reducing compound selected from the group consisting of a reducing inorganic compound and a reducing organic compound that have a reducing property and exist as a solid or a liquid at ordinary temperature and ordinary pressure. When the reducing compound is a reducing inorganic compound, an organic compound (regardless of whether or not a reducing compound) is further incorporated. The timing and sequence of addition of the reducing compound and organic compound are not specifically limited. In an embodiment, they can be present along with other compounds during preparation of the precursor. In yet another embodiment, they can be mixed with the precursor before the precursor that has been prepared is subjected to the hexagonal ferrite conversion reaction. The details will be set forth further below.

(ii) The Reducing Compound

In an embodiment, the reducing compound can be mixed with the water-based solvent along with the starting materials and base during preparation of the precursor. Causing the reducing compound to be present in the water-based solution for preparing the precursor makes it possible for the reducing compound to be present on either the surface of or within the precursor. A compound that exists as a solid or as a liquid at ordinary temperature and ordinary pressure is used as the reducing compound here in order to increase the uniformity of the state in which the reducing compound is present within the precursor (for example, adhering to the surface thereof). Also from the perspective of the safety of the process, a compound that exists as a solid or liquid at ordinary temperature and ordinary pressure is desirable. The precursor that has been prepared in this manner is converted to hexagonal ferrite as described in detail further below, making it possible to obtain hexagonal ferrite of small particle size and high saturation magnetization. However, in another embodiment, the conversion to hexagonal ferrite can be induced after mixing the precursor that has been prepared and the reducing compound. This is described in detail further below.

Any reducing compound that exhibits a reducing property and exists as a solid or liquid at ordinary temperature and ordinary pressure as set forth above can be employed without restriction. Specific examples of reducing compounds are: sodium borohydride, lithium borohydride, and other hydride compounds; formalin, acetaldehyde, and other aldehydes; sulfites; formic acid, oxalic acid, succinic acid, ascorbic acid, and other carboxylic acids or lactones; ethanol, butanol, octanol, and other aliphatic monoalcohols; terpineol and other alicyclic monoalcohols; other monoalcohols; ethylene glycol, propylene glycol, diethylene glycol, dipropylene glycol, and other aliphatic diols; glycerin, trimethylol propane, and other polyhydric alcohols; polyethylene glycol, polypropylene glycol, and other polyethers; diethanolamine, monoethanolamine, and other alkanolamines; hydroquinone; resorcinol; aminophenol; glucose; sodium citrate; and hypochlorous acid and salts thereof. In addition, among the organic compounds set forth further below, those that exhibit a reducing property and exist as a solid or liquid at ordinary temperature and ordinary pressure can be used as reducing compounds. Examples of desirable reducing compounds are hydrazine compounds and amine compounds.

The hydrazine compounds include hydrazine ($NH_2$—$NH_2$), hydrazine derivatives obtained by replacing one or more of the four hydrogen atoms of hydrazine with a substituent, and hydrates and salts thereof. In the present invention and present specification, examples of substituents are linear, branched, and cyclic alkyl groups (such as alkyl groups having 1 to 6 carbon atoms), alkoxy groups (such as alkoxy groups having 1 to 6 carbon atoms), halogen atoms (such as fluorine atoms, chlorine atoms, and bromine atoms), aryl groups (such as phenyl groups), and heteroaryl groups. Desirable specific examples of hydrazine compounds are hydrazine, hydrazine monohydrate, hydrazine carbonate, hydrazinium sulfate, phenyl hydrazine, 1-methyl-1-phenylhydrazine, and 1,1-diphenylhydrazine hydrochloride.

The amine compound can be a primary amine, secondary amine, or tertiary amine. The structure can also comprise a cyclic structure. Specific examples of amine compounds are triethylamine, triethanolamine, and dimethylaminoethanol. The organic amines described further below can also be employed.

When mixing in a reducing compound during preparation of the precursor, from the perspective of obtaining hexagonal ferrite powder of small particle size and high saturation magnetization, equal to or more than 2 mole parts are desirably added, equal to or more than 5 mole parts are preferably added, equal to or more than 10 mole parts are more preferably added, equal to or more than 20 mole parts are still more preferably added, equal to or more than 30 mole parts are yet more preferably added, equal to or more than 40 mole parts are yet still more preferably added, and equal to or more than 50 mole parts are even more preferably added per combined total of 100 mole parts of precursor starting materials in the form of iron salt and divalent metal salt. From the perspective of obtaining hexagonal ferrite powder affording even higher saturation magnetization, the amount added is desirably equal to or less than 300 mole parts, preferably equal to or less than 250 mole parts, more preferably equal to or less than 200 mole parts, still more preferably equal to or less than 150 mole parts, and yet still more preferably, equal to or less than 100 mole parts.

The precursor can be prepared in the presence of an organic compound (regardless of whether or not a reducing compound). The precursor that has been prepared in the presence of an organic compound can conceivably be converted to hexagonal ferrite (subjected to the conversion reaction) in a state of having been surface coated with the organic compound; and crystallized after being instantaneously dissolved in a reaction system in which high-temperature, high-pressure water is present, thereby causing hexagonal ferrite to precipitate out as particles (conversion to hexagonal ferrite). During the period from dissolution to crystallization, the presence of the organic compound in the vicinity of the particles is presumed by the present inventor to contribute to further reducing the particle size of the hexagonal ferrite particles that crystallize and rendering the particle size uniform. In addition, preparing the precursor in the presence of an organic compound is thought by the present inventor to inhibit aggregation of the precursor, contribute to obtaining precursor of small particle size and good particle size uniformity, and thus contribute to obtaining hexagonal ferrite that is of smaller particle size and more uniform particle size. When employing a reducing organic compound as a reducing compound, the reducing organic compound is thought to contribute to the above. Thus, it is unnecessary to add a separate organic compound (regardless of whether or not a reducing compound) from the reducing organic compound. However, mixing the precursor with the reducing organic compound and a further organic compound prior to subjecting the precursor to the hexagonal ferrite conversion reaction is desirable from the perspective of obtaining hexagonal ferrite powder of even smaller particle size and desirable from the perspective of obtaining hexagonal ferrite powder of more uniform particle size. In contrast, when employing an inorganic compound as the reducing compound, a further organic compound is mixed with the precursor at least prior to subjecting it to the hexagonal ferrite conversion reaction.

Details regarding the organic compound are as set forth further below. The organic compound can be present in the water-based solution along with the precursor starting materials. The mixing sequence with the precursor starting materials is not specifically limited. From the perspective of more effectively inhibiting aggregation of the precursor during preparation, it is desirable to add the starting materials after adding and dissolving or suspending the organic compound in the water-based solvent. The organic compound can be added as is to the water-based solvent, or can be added in the form of a solution or suspension. Solvents that can be used for the solution or suspension are as set forth above.

The amount of organic compound employed desirably falls within a range of 0.01 weight part to 1,000 weight parts, preferably falls within a range of 0.05 weight part to 500 weight parts, and more preferably falls within a range of 0.1 weight part to 300 weight parts per 100 weight parts of precursor. The amount of precursor serving as a reference here is a measured value or the theoretically production amount based on the amount of starting materials fed. This holds true for the values given below using the precursor amount as a reference.

The mixing order of the starting materials, base, reducing compound added as needed, and organic compound during preparation of the precursor is not specifically limited. These components can be sequentially added to the water-based solvent in any order, two or more can be simultaneously mixed, or all can be simultaneously mixed. The mixing can be conducted in a batch-type reaction tank or in a continuous-type reaction tank. These components and the water-based solution containing a water-based solvent are normally stirred and mixed with a known stirring means such as a magnetic stirrer in the reaction tank.

<Conversion of the Precursor to Hexagonal Ferrite>

In the above manufacturing method, the hexagonal ferrite precursor, reducing compound, and water-based solution containing an organic compound are heated to equal to or higher than 300° C. and pressurized to equal to or higher than 20 MPa to convert the precursor to hexagonal ferrite. When the reducing compound and organic compound have not been added during preparation of the precursor, these compounds are admixed with the precursor prior to subjecting it to the hexagonal ferrite conversion reaction.

Generally, a fluid containing water as solvent is heated to equal to or higher than 300° C. and pressurized to equal to or higher than 20 MPa to place the water contained in the fluid in a subcritical to supercritical state. The water that is contained desirably promotes the reaction converting the precursor to hexagonal ferrite (ferrite conversion) by assuming a subcritical to supercritical state, thereby making it possible to obtain hexagonal ferrite.

The following are examples of specific embodiments of processes of converting a hexagonal ferrite precursor into hexagonal ferrite.

(1) A water-based solution containing hexagonal ferrite precursor and a reducing compound is continuously fed to a reaction flow passage within which a fluid flowing therein is subjected to heating to equal to or higher than 300° C. and pressurizing to equal to or higher than 20 MPa to convert the precursor to hexagonal ferrite in the reaction flow passage.

(2) A water-based solution containing hexagonal ferrite precursor and a reducing compound is mixed with heated and pressurized water, desirably water that is heated to a temperature of equal to or higher than 200° C. and pressurized to a pressure of equal to or higher than 20 MPa, and then continuously fed to a reaction flow passage within which a fluid flowing therein is subjected to heating to equal to or higher than 300° C. and pressurizing to equal to or higher than 20 MPa to convert the precursor to hexagonal ferrite.

Embodiment (2), in which heated and pressurized water and the water-based solution containing hexagonal ferrite precursor and the above compound are brought into contact differs from Embodiment (1), in which the water contained in the water-based solution containing the above compound and hexagonal ferrite is heated and pressurized to put it in a subcritical to supercritical state. For example, the water-based solution can be brought into contact with the heated and pressurized water by adding the water-based solution containing hexagonal ferrite and the above compound to a flow passage through which heated and pressurized water is continuously flowing. In an embodiment, a flow passage to which heated and pressurized water is continuously being fed is converged with a flow passage to which a water-based solution containing hexagonal ferrite precursor and the above compound is continuously being fed to mix the heated and pressurized water with the water-based solution containing precursor and the above compound. In Embodiment (2), contact with heated and pressurized water can instantaneously place the hexagonal ferrite precursor in a highly reactive state, causing the conversion to ferrite to proceed early on, which is advantageous. Generally, heating water to equal to or higher than 200° C. and pressurizing it to equal to or higher than 20 MPa can place it in a subcritical to supercritical state of extremely high reactivity. Accordingly, in Embodiment (2), the water is desirably heated to a temperature of equal to or higher than 200° C. and pressurized to a pressure of equal to or higher than 20 MPa.

As set forth above, the water-based solution containing precursor and a reducing compound can further contain an organic compound. When an inorganic compound is employed as the reducing compound, a further organic compound is incorporated into the water-based solution. This organic compound can be added during preparation of the precursor in an embodiment, as set forth above. When the state in which the further organic compound and the reducing compound are present is not limited to a coating on the precursor; they can be incorporated into the interior of the precursor.

In another embodiment, either one, or both, of the reducing compound and the further organic compound can be simultaneously, or in any order, added to the water-based solution containing the hexagonal ferrite precursor, and then subjected to the steps of Embodiment (1) or Embodiment (2) above. This makes it possible to coat the compounds on the hexagonal ferrite precursor.

In the above embodiments, the reducing compound is desirably admixed in an amount of 1 weight par to 1,000 weight parts per 100 weight parts of hexagonal ferrite precursor. The reducing compound can be added as is to a water-based solution containing the hexagonal ferrite precursor. Adding it as a solution containing the reducing compound in a solvent (a reducing compound solution) is desirable to obtain hexagonal ferrite powder of smaller particle size and higher saturation magnetization. Water or an organic solvent that is miscible with water or hydrophilic is desirably employed as the solvent. For this reason, a polar solvent is suitably employed as the organic solvent. In this context, the term "polar solvent" refers to a solvent that either has a dielectric constant of equal to or higher than 15 or has a solubility parameter of equal to or higher than 8. The various solvents set forth above are examples of desirable organic solvents.

Examples of the further organic compound are organic carboxylic acids, organic nitrogen compounds, organic sulfur compounds, organic phosphorus compounds, salts thereof, surfactants, and various polymers. Examples of suitable polymers are those having a weight average molecular weight of about 1,000 to about 100,000. Those exhibiting water solubility are desirable. Examples of desirable polymers are nonionic polymers and hydroxyl group-comprising polymers. Salts of alkali metals are suitable as the above salts. The above weight average molecular weight refers to a value that is measured by gel permeation chromatography (GPC) and converted to a polystyrene value.

Examples of organic carboxylic acids are aliphatic carboxylic acids, alicyclic carboxylic acids, and aromatic carboxylic acids. Aliphatic carboxylic acids are desirable. The aliphatic carboxylic acid may be a saturated aliphatic carboxylic acid or an unsaturated aliphatic carboxylic acid, with an unsaturated carboxylic acid being preferred. The number of carbon atoms of the carboxylic acid is not specifically limited; for example, it can be equal to or more than 2. By way of example, it can be equal to or lower than 24, desirably equal to or lower than 20, preferably equal to or lower than 16. Specific examples of aliphatic carboxylic acids are: oleic acid, linoleic acid, linolenic acid, caprylic acid, capric acid, lauric acid, behenic acid, stearic acid, myristic acid, palmitic acid, myristoleic acid, palmitoleic acid, vaccenic acid, eicosenoic acid, propanoic acid, butanoic acid, pentanoic acid, hexanoic acid, heptanoic acid, octanoic acid, nonanoic acid, decanoic acid, dodecanoic acid, tetradecanoic acid, hexadecanoic acid, heptadecanoic acid, octadecanoic acid, nonadecanoic acid, icosanoic acid, and acetic acid; as well as dicarboxylic acids such as malonic acid, succinic acid, and adipic acid. However, there is no limitation thereto.

Examples of organic nitrogen compounds are organic amines, organic amide compounds, and nitrogen-containing heterocyclic compounds.

The organic amine can be a primary amine, secondary amine, or tertiary amine. Primary and secondary amines are desirable. Aliphatic amines are an example, as are primary and secondary aliphatic amines. The number of carbon atoms of the amines is not specifically limited; examples are equal to or more than 5 but equal to or lower than 24, desirably equal to or more than 8 and equal to or lower than 20, preferably equal to or more than 12 but equal to or lower than 18. Specific examples of organic amines are alkylamines such as oleylamine, laurylamine, myristylamine, palmitylamine, stearylamine, octylamine, decylamine, dodecylamine, tetradecylamine, hexadecylamine, octadecylamine, and dioctylamine; aromatic amines such as aniline; hydroxyl group-comprising amines such as methylethanolamine and diethanolamine; and derivatives thereof.

Examples of nitrogen-containing heterocyclic compounds are saturated and unsaturated heterocyclic compounds having three to seven-membered rings with 1 to 4 nitrogen atoms. Hetero atoms in the form of sulfur atoms, oxygen atoms, and the like can be contained. Specific examples are pyridine, lutidine, cholidine, and quinolines.

Examples of organic sulfur compounds are organic sulfides, organic sulfoxides, and sulfur-containing heterocyclic compounds. Specific examples are dialkyl sulfides such as dibutyl sulfide; dialkyl sulfoxides such as dimethyl sulfoxide and dibutyl sulfoxide; and sulfur-containing heterocyclic compounds such as thiophene, thiolane, and thiomorpholine.

Examples of organic phosphorus compounds are phosphoric acid esters, phosphines, phosphine oxides, trialkyl phosphines, phosphorous acid esters, phosphonic acid esters, sub-phosphonic acid esters, phosphinic acid esters, and sub-phosphinic acid esters. Examples are tributyl phosphine, trihexyl phosphine, trioctyl phosphine, and other trialkyl phosphines; tributyl phosphine oxide, trihexyl phosphine oxide, trioctyl phosphine oxide (TOPO), tridecyl phosphine oxide, and other trialkyl phosphine oxides.

Examples of polymers and surfactants are polyethylene glycol, polyoxyethylene (1) lauryl ether phosphate, lauryl ether phosphate, sodium polyphosphate, sodium bis(2-ethylhexyl)sulfosuccinate, sodium dodecylbenzene sulfonate, polyacrylic acid and its salts, polymethacryic acid and its salts, polyvinyl alcohol, other hydroxyl group-comprising polymers, polyvinyl pyrrolidone, other nonionic polymers, and hydroxyethyl cellulose. Any from among cationic, anionic, and nonionic surfactants, as well as amphoteric surfactants, can be employed. Anionic surfactants are desirable.

The above organic compound is desirably admixed in an amount of about 1 weight part to 1,000 weight parts per 100 weight parts of hexagonal ferrite precursor. The organic compound can be added as is to a water-based solution containing the hexagonal ferrite precursor. Adding it as a solution containing the organic compound in a solvent (an organic compound solution) is desirable to obtain hexagonal ferrite powder of smaller particle size. Water or an organic solvent that is miscible with water or hydrophilic is desirably employed as the solvent. For this reason, a polar solvent is suitably employed as the organic solvent. In this context, the term "polar solvent" refers to a solvent that at least either has a dielectric constant of equal to or higher than 15 or has a solubility parameter of equal to or higher than 8. The various solvents set forth above are examples of desirable organic solvents.

When the water-based solution containing precursor is admixed with a reducing compound and an organic compound, the mixing can be done in batch form or continuously. Conducting it in a manner continuous with subsequent steps is desirable to increase productivity.

FIG. 1 is a schematic descriptive drawing of a manufacturing device that is suited to the hydrothermal synthesis process. An example of a specific embodiment of the method of manufacturing hexagonal ferrite powder according to an aspect of the present invention will be described below based on FIG. 1. However, the present invention is not limited to the embodiment set forth below.

The manufacturing device shown in FIG. 1 comprises liquid tanks 1, 2, 3; heating means 4 (4a to 4c), pressurized liquid means 5a, 5b, 5c; a reaction flow passage 6; a cooling element 7; filtering means 8; a pressure-regulating valve 9; and a recovery element 10. Fluids are fed to the various liquid tanks through pipes 100, 101, 102.

In an embodiment, water in the form of purified water, distilled water, or the like is fed to liquid tank 1; solution containing hexagonal ferrite precursor and a reducing compound in a water-based solvent (precursor solution) is fed to liquid tank 2; and organic compound solution is fed to liquid tank 3. The water that has been introduced into liquid tank 1 is fed into pipe 100 while being pressurized by pressurized liquid feeding means 5a and is heated by heating means 4, arriving at mixing element M1 in a subcritical to supercritical state.

The precursor solution that has been fed to pipe 101 by pressurized liquid feeding means 5b from liquid tank 2 is converged with the organic compound solution that has been fed to pipe 102 by pressurized liquid feeding means 5c from liquid tank 3, reaching mixing element M1.

Before arriving at mixing element M1, the organic compound is desirably coated on the surface of the hexagonal ferrite precursor. The reducing compound is desirably contained on at least the surface or in the interior of the hexagonal ferrite precursor. Coating the hexagonal ferrite precursor with the organic compound before contact with the water in a subcritical to supercritical state in this manner is advantageous to obtaining hexagonal ferrite of small particle size. Thus, water or an organic solvent that is miscible with water or hydrophilic is desirably employed as the solvent of the organic compound solution.

Next, in mixing element M1, the water-based solution containing the hexagonal ferrite precursor, desirably containing a reducing compound, and preferably containing an organic compound, comes into contact with water in a subcritical to supercritical state, initiating conversion of the precursor to ferrite. Subsequently, the product is heated in reaction flow passage 6 and pressurized by pressurizing means 5a to place the water contained in the reaction system in reaction flow passage 6 in a subcritical to supercritical state, causing the conversion of precursor to ferrite to advance further. Subsequently, a solution containing hexagonal ferrite in the form of hexagonal ferrite precursor that has been converted to ferrite is discharged through discharge outlet M2. The discharged solution is cooled by being mixed with cold water in cooling element 7, after which the hexagonal ferrite is collected by filtering means 8 (a filter or the like). The hexagonal ferrite that has been collected by filtering means 8 is released from filtering means 8, passes through pressure-regulating valve 9, and is recovered in recovery element 10.

In the above method, high pressure-use metal piping is desirably employed as the pipes because pressure is applied to the liquids being internally fed. The metal constituting the piping is desirably stainless steel such as SUS 316 or SUS 304, which corrodes little, or a nickel-based alloy such as Inconel (Japanese registered trademark) or Hastelloy (Japanese registered trademark). However, there is no limitation to the use of these metals; equivalent or similar materials can also be used. The piping of laminate structure described in Japanese Unexamined Patent Publication (KOKAI) No. 2010-104928, which is expressly incorporated herein by reference in its entirety, can also be employed.

n the manufacturing device shown in FIG. 1, the water in a subcritical to supercritical state and the precursor solution are mixed together in a mixing element M1 where the pipes are joined by a T-shaped joint. However, it is also possible to employ a reactor such as that employed in Japanese Unexamined Patent Publication (KOKAI) No. 2007-268503, 2008-12453, or 2010-75914, which are expressly incorporated herein by reference in their entirety. The reactor material is desirably that described in Japanese Unexamined Patent Publication (KOKAI) No. 2007-268503, 2008-12453, or 2010-75914. Specifically, the metal constituting the piping is desirably one of the above-described metals. However, it is not limited to them; an equivalent or similar material can be employed. Combination with a low-corrosion titanium alloy, tantalum alloy, ceramic, or the like is also possible.

A process whereby an organic compound is added to a precursor solution (containing precursor and a reducing compound) and the mixture is subjected to the steps of above-described Embodiment (2) to obtain hexagonal ferrite modified with the organic compound is described above. However, it is also possible to add the organic compound to the precursor solution and then subject the mixture to the process of Embodiment (1) set forth above.

By heating to a temperature of equal to or higher than 300° C. and pressurizing to equal to or higher than 20 MPa a reaction system in which water is present, the water is placed in a subcritical to supercritical state, and a highly reactive reaction field can be created. Placing the hexagonal ferrite precursor in such a state can cause the conversion to ferrite to proceed rapidly, making it possible to obtain hexagonal ferrite. It suffices for the heating temperature to be a temperature of equal to or higher than 300° C. within the reaction system, desirably ranging from 350° C. to 500° C. The pressure applied to the reaction system is equal to or higher than 20 MPa as stated above, desirably ranging from 20 MPa to 50 MPa.

A number of specific embodiments of the method of manufacturing hexagonal ferrite powder according to an aspect of the present invention have been set forth above. However, the present invention is not limited to these specific embodiments.

Hexagonal Ferrite Powder

A further aspect of the present invention relates to hexagonal ferrite powder manufactured by the above manufacturing method.

It is possible to obtain hexagonal ferrite powder of small particle size and high saturation magnetization by a hydrothermal synthesis process based on the manufacturing method set forth above. The saturation magnetization of the hexagonal ferrite powder is desirably equal to or higher than 40 A·m²/kg, preferably equal to or higher than 45 A·m²/kg, more preferably equal to or higher than 50 A·m²/kg. The saturation magnetization is, for example, equal to or lower than 70 A·m²/kg. From the perspective of enhancing the SNR, a high saturation magnetization is desirable. Thus, the saturation magnetization can exceed 70 A·m²/kg.

The average particle size of the hexagonal ferrite powder obtained by the manufacturing method set forth above is desirably equal to or lower than 50 nm, preferably equal to or lower than 45 nm, more preferably equal to or lower than 40 nm, still more preferably equal to or lower than 35 nm, yet more preferably equal to or lower than 30 nm, yet still more preferably equal to or lower than 25 nm, and even more preferably, equal to or lower than 20 nm. Hexagonal ferrite powder of small particle size is desirable from the perspective of achieving higher recording densities. From the perspective of stable magnetization, the average particle size is desirably equal to or higher than 5 nm, preferably equal to or higher than 10 nm, and more preferably, equal to or higher than 15 nm.

In the present invention, the term "average particle size" means the average equivalent spherical diameter. The term "average equivalent spherical diameter" is a value obtained by observation by a transmission electron microscope. Specifically, a transmission electron microscope with an acceleration voltage of 100 kV is employed (such as a model H-9000 transmission electron microscope made by Hitachi) to directly photograph particles. The equivalent spherical diameters of 500 particles are obtained from their projected areas in the photograph, and the average value of the 500 particles is adopted as the average equivalent spherical diameter. More specifically, a photograph of the particles is taken at a magnification of 100,000-fold and printed on photographic paper at a total magnification of 500,000-fold. Target particles are selected in the particle photograph, the contours of the particle are traced with a digitizer, and image analysis software (such as the image analysis software KS-400 made by Carl Zeiss) is used to measure the particle size. For non-isotropic particles such as tabular particles, the diameter and thickness are obtained by lateral observation by a transmission electron microscope, and the equivalent spherical diameter is determined. In this context, the term "isotropic particles" means particles with a ratio of major axis length to minor axis length (major axis length/minor axis length) of equal to or more than 1 but equal to or less than 2, desirably to particles with a ratio of equal to or more than 1 but equal to or less than 1.5. However, the particles that are contained in the hexagonal ferrite powder are not limited to isotropic particles. The major axis is determined as the longest axis (straight line) that can be passed through the particle. The length of the major axis is adopted as the major axis length. The minor axis is determined as the longest line passing through the particle that is perpendicular to the major axis. The length of the minor axis is adopted as the minor axis length.

Particle size uniformity can be denoted as the coefficient of variation in particle size. In the present invention, the term "coefficient of variation in particle size" refers to the coefficient of variation in the equivalent spherical diameter. The term "coefficient of variation in the equivalent spherical diameter" is a value that is obtained by calculating the standard deviation in the equivalent spherical diameter of 500 particles obtained by the method set forth above, and dividing it by the average equivalent spherical diameter. The hexagonal ferrite powder obtained by the manufacturing method set forth above can have, for example, a coefficient of variation in particle size ranging from 5% to 40%. This coefficient of variation can fall within a range of 10% to 30%, or even 15% to 30%. For example, in a magnetic recording medium, good particle size uniformity is desirable in the ferromagnetic powder contained in the magnetic layer from the perspectives of noise reduction and recording retention.

The particle size and coefficient of variation in particle size set forth above can be obtained by observing the powder that is present as powder by a transmission electron microscope. A measurement sample of the powder that is contained in a coating such as a magnetic layer of a magnetic recording medium can be obtained by collecting powder from the coating. The measurement sample can be collected, for example, from a magnetic layer by the following method.

1. Subjecting the surface of the magnetic layer to 1 to 2 minutes of surface treatment with a plasma reactor made by Yamato Scientific Co., Ltd., and ashing the organic components (binder, curing agent and the like) of the surface of the magnetic layer to remove them.

2. Adhering filter paper that has been immersed in an organic solvent such as cyclohexanone or acetone to the edge portion of a metal rod, rubbing the surface of the magnetic layer that has been treated as in 1. above on it, and transferring the magnetic layer component from the magnetic layer to the filter paper to separate it.

3. Shaking off the component separated by 2. above in a solvent such as cyclohexanone or acetone (placing each piece of filter paper in solvent and using an ultrasonic disperser to shake it off), drying the solvent, and removing the separated component.

4. Placing the component that has been scraped off in 3. above in a glass test tube that has been thoroughly cleaned, adding n-butyl amine to about 20 mL of the magnetic layer component, and sealing the glass test tube. (The n-butyl amine is added in a quantity adequate to decompose the remaining binder or the like that has not been ashed.)

5. The glass test tube is heated for equal to or more than 20 hours at 170° C. to decompose the organic component.

6. The precipitate following the decomposition of 5. above is thoroughly washed with pure water and dried, and the powder is recovered.

7. A neodymium magnet is placed near the powder that has been collected in 6. and the powder that is attracted (that is, magnetic powder) is collected.

Ferromagnetic powder can be collected from the magnetic layer by the above steps. Since the above processing can impart almost no damage to the particles, the above method permits measurement of the particle size of powder in the state in which it was contained in the magnetic layer.

Magnetic Recording Medium

A further aspect of the present invention relates to a magnetic recording medium, which comprises a magnetic layer comprising ferromagnetic powder and binder on a nonmagnetic support, wherein the ferromagnetic powder is the above hexagonal ferrite powder. Employing the above hexagonal ferrite powder as ferromagnetic powder in the magnetic layer can provide a magnetic recording medium affording good electromagnetic characteristics (a high SNR).

The magnetic recording medium according to an aspect of the present invention will be described in detail below.

Magnetic Layer

Details of the ferromagnetic powder that is employed in the magnetic layer, and of the method of manufacturing it, are as set forth above.

The magnetic layer contains ferromagnetic powder and binder. Polyurethane resins, polyester resins, polyamide resins, vinyl chloride resins, acrylic resins such as those provided by copolymerizing styrene, acrylonitrile, methyl methacrylate and the like, cellulose resins such as nitrocellulose, epoxy resins, phenoxy resins, polyvinylacetal, polyvinylbutyral, and other polyvinyl alkylal resins can be employed singly, or as mixtures of multiple resins, as the binder contained in the magnetic layer. Among these, desirable resins are polyurethane resin, acrylic resins, cellulose resins, and vinyl chloride resins. These resins can also be employed as binders in the nonmagnetic layer described further below. Reference can be made to paragraphs 0029 to 0031 of Japanese Unexamined Patent Publication (KOKAI) No. 2010-24113, which is expressly incorporated herein by reference in its entirety, with regard to the above binders. Polyisocyanate curing agents can also be employed with the above resins.

Additives can be added as needed to the magnetic layer. Examples of additives are abrasives, lubricants, dispersing agents, dispersion adjuvants, antifungal agents, antistatic agents, oxidation inhibitors, solvents, and carbon black. The additives set forth above can be suitably selected for use from among commercial products based on the properties desired.

Nonmagnetic Layer

The contents of the nonmagnetic layer will be described in detail next. The magnetic recording medium of an aspect of the present invention can comprise a nonmagnetic layer containing nonmagnetic powder and binder between the nonmagnetic support and the magnetic layer. The nonmagnetic powder that is employed in the nonmagnetic layer can be an organic or an inorganic material. Carbon black and the like can also be employed. Examples of inorganic materials are metals, metal oxides, metal carbonates, metal sulfates, metal nitrides, metal carbides, and metal sulfides. Nonmagnetic powders of these materials are available as commercial products and can be manufactured by known methods. For details, reference can be made to Japanese Unexamined Patent Publication (KOKAI) No. 2010-24113, paragraphs 0036 to 0039.

The binders, lubricants, dispersing agents, additives, solvents, dispersion methods, and the like of the magnetic layer are also suitable for use for the nonmagnetic layer. Techniques that are known for magnetic layers can also be applied to the quantity and type of binder, the quantities and types of additives and dispersing agents added, and the like. Carbon black and organic material powders can also be added to the nonmagnetic layer. In this regard, by way of example, reference can be made to Japanese Unexamined Patent Publication (KOKAI) No. 2010-24113, paragraphs 0040 to 0042.

Nonmagnetic Support

Examples of nonmagnetic supports are known supports such as biaxially stretched polyethylene terephthalate, polyethylene naphthalate, polyamide, polyamide-imide, and aromatic polyamide. Among these, polyethylene terephthalate, polyethylene naphthalate, and polyamide are desirable.

These supports can be subjected in advance to corona discharge, plasma treatment, adhesion-enhancing treatment, heat treatment, or the like. The surface roughness of a nonmagnetic support that is suited to use in the present invention is desirably a center average roughness Ra of 3 nm to 10 nm at a cutoff value of 0.25 mm.

Layer Structure

In the thickness structure of the magnetic recording medium according to an aspect of the present invention, the thickness of the nonmagnetic support is desirably 3 µm to 80 µm. The thickness of the magnetic layer can be optimized based on the amount of saturation magnetization of the magnetic head employed, the length of the head gap, and the bandwidth of the recording signal. Generally, it can be 0.01 µm to 0.15 µm, desirably 0.02 µm to 0.12 µm, and preferably, 0.03 µm to 0.10 µm. It suffices for the magnetic layer to be comprised of a least one layer, but it can separated into two or more layers having different magnetic characteristics. The structures of known multilayer magnetic layers can be applied.

The thickness of the nonmagnetic layer is for example 0.1 µm to 3.0 µm, desirably 0.3 µm to 2.0 µm, and preferably 0.5 µm to 1.5 µm. The nonmagnetic layer of a magnetic recording medium according to an aspect of the present invention includes an essentially nonmagnetic layer containing trace quantities of ferromagnetic powder, for example, either as impurities or intentionally, in addition to the nonmagnetic powder. The essentially nonmagnetic layer means a layer exhibiting a residual magnetic flux density of equal to or less than 10 mT, a coercive force of equal to or less than 7.96 kA/m (100 Oe), or a residual magnetic flux density of equal to or less than 10 mT and a coercive force of equal to or less than 7.96 kA/m (100 Oe). The nonmagnetic desirably has no residual magnetic flux density or coercive force.

Backcoat Layer

A backcoat layer can be provided on the opposite surface of the nonmagnetic support from that on which the magnetic layer is present in the magnetic recording medium. The backcoat layer desirably comprises carbon black and inorganic powder. The formula of the magnetic layer and nonmagnetic layer can be applied to the binder and various additives used to form the backcoat layer. The thickness of the back coat layer is desirably equal to or less than 0.9 µm, preferably 0.1 µm to 0.7 µm.

Manufacturing Method

The process of manufacturing the coating liquid for forming the magnetic layer, nonmagnetic layer, or backcoat layer normally comprises at least a kneading step, dispersing step, and mixing steps provided as needed before and after these steps. The various steps can each be divided into two or more steps. All of the starting materials employed in the present invention, such as ferromagnetic powder (hexagonal ferrite powder), nonmagnetic powder, binder, carbon black, abrasives, antistatic agents, lubricants, and solvents, can be added either initially during the step or part way through. Any individual starting material can be divided for addition in two or more steps. For example, polyurethane can be divided up and added during a kneading step, dispersing step, or mixing step following dispersion to adjust the viscosity. In an aspect of the present invention, conventionally known manufacturing techniques can be employed for some of the steps. In the kneading step, it is desirable to employ an apparatus with powerful kneading strength in the kneading step, such as an open kneader, continuous kneader, pressurizing kneader, or extruder. Details on these kneading treatments are described in Japanese Unexamined Patent Publication (KOKAI) Heisei No. 1-106338 and Heisei No. 1-79274, which are expressly incorporated herein by reference in their entirety. Glass beads can also be used to disperse the magnetic layer coating liquid, nonmagnetic layer coating liquid, or backcoat layer coating liquid. High specific gravity dispersing beads in the form of zirconia beads, titania beads, and steel beads are also suitable. The particle diameter and packing rate of these dispersing beads can be optimized for use. A known dispersing apparatus can be employed. For details on methods of manufacturing magnetic recording media, reference can be made to Japanese Unexamined Patent Publication (KOKAI) No. 2010-24113, paragraphs 0051 to 0057, for example.

The magnetic recording medium according to an aspect of the present invention set forth above can afford good electromagnetic characteristics in the high-density recording by containing the above hexagonal ferrite powder in the magnetic layer thereof. Thus, it is suitable as a high-capacity magnetic recording medium such as a backup tape.

EXAMPLES

The present invention will be described in greater detail below through Examples. However, the present invention is not limited to the embodiments shown in Examples. The "parts" and "percent" indicated below denote "weight parts" and "weight percent," respectively. Unless specifically stated otherwise, the steps and evaluations set forth below were conducted in air at 23° C.±1° C.

1. Examples and Comparative Examples Relating to Hexagonal Ferrite Powder (Ferromagnetic Powder)

Example 1

(1) Preparation of Precursor Solution (Precursor Aqueous Solution)

In a batch-type reaction tank, a divalent metal salt in the form of barium hydroxide ($Ba(OH)_2.8H_2O$), an iron salt in the form of iron(III) nitrate ($Fe(NO_3)_3.9H_2O$), KOH, and a reducing compound in the form of hydrazine ($N_2H_4.H_2O$) were admixed to purified water. The mixture was stirred and mixed with a magnetic stirrer to prepare a precursor solution (sol) of pH 9. The combined amount of the divalent metal salt and iron salt used to prepare the sol was adjusted to achieve a precursor solution (sol) concentration of 0.01 M and Ba/Fe=50 atom %. The hydrazine was added in a proportion of 60 mole parts per 100 mole parts of divalent metal salt and iron salt combined.

(2) Preparation of Organic Compound Solution

Oleic acid was dissolved in ethanol to prepare an organic compound solution. The concentration of the prepared solution was 0.2 M.

(3) Synthesis of Hexagonal Ferrite (Conversion of Precursor to Hexagonal Ferrite)

The aqueous solution (sol) was introduced into liquid tank 2 of the manufacturing device shown in FIG. 1 and the organic compound solution into liquid tank 3. SUS 316BA tube was employed as the piping in the manufacturing device.

Purified water that had been introduced into liquid tank 1 was heated by a heater 4 while being fed by a high-pressure pump 5a to cause 30 mL/min of high-temperature, high-pressure water to flow through pipe 100. In this process, the temperature and pressure were controlled so that the temperature of the high-temperature high-pressure water after passing through heating means 4c was 450° C. and the pressure was 30 MPa.

The precursor solution (sol) and organic compound solution were fed to pipes 101 and 102 at a liquid temperature of 25° C. by high-pressure pumps 5b and 5c in a volumetric ratio of aqueous solution: organic compound solution=5:5. Along the way, the two flow passages were converged and the two liquids were mixed. The mixed liquid obtained was mixed with the high-temperature high-pressure water in mixing element M1. In reaction flow passage 6, the mixture was heated to 400° C. and pressurized to 30 MPa to synthesize hexagonal ferrite (convert the precursor).

Subsequently, in cooling element 7, the liquid containing barium ferrite particles (ferromagnetic particles) was cooled with cold water and the particles were collected.

The particles that had been collected were washed with ethanol and then centrifuged to separate the barium ferrite ferromagnetic particles.

Example 2

With the exception that 10 mole parts of hydrazine were added per 100 mole parts of divalent metal salt and iron salt combined, the same process was conducted as in Example 1.

Example 3

With the exception that 5 mole parts of hydrazine were added per 100 mole parts of divalent metal salt and iron salt combined, the same process was conducted as in Example 1.

Example 4

With the exception that 100 mole parts of hydrazine were added per 100 mole parts of divalent metal salt and iron salt combined, the same process was conducted as in Example 1.

Example 5

With the exception that 200 mole parts of hydrazine were added per 100 mole parts of divalent metal salt and iron salt combined, the same process was conducted as in Example 1.

Example 6

With the exception that 2 mole parts of hydrazine were added per 100 mole parts of divalent metal salt and iron salt combined, the same process was conducted as in Example 1.

Example 7

With the exception that 250 mole parts of hydrazine were added per 100 mole parts of divalent metal salt and iron salt combined, the same process was conducted as in Example 1.

Comparative Example 1

With the exception that no hydrazine was added, the same process was conducted as in Example 1.

Comparative Example 2

With the exception that precursor solution was not mixed with organic compound solution, the same process was conducted as in Example 1.

Example 8

With the exception that a divalent metal salt in the form of strontium nitrate ($Sr(NO_3)_2.4H_2O$) was employed, the same process was conducted as in Example 1.

Example 9

With the exception that trimethylamine $((C_2H_5)_3N)$ was used instead of hydrazine, the same process was conducted as in Example 1.

Example 10

With the exception that triethanolamine $((C_2H_5O)_3N)$ was employed instead of hydrazine, the same process was conducted as in Example 1.

<Evaluation Methods>

(1) X-Ray Diffraction Analysis

When the powders obtain in Examples and Comparative Examples were subjected to X-ray diffraction analysis, each was found to be an M-type hexagonal ferrite $AFe_{12}O_{19}$ (A: Ba or Sr) monophase.

The X-ray diffraction analysis was conducted by scanning with CuKa radiation under conditions of 45 kV and 40 mA to measure an XRD pattern. The X-ray powder diffraction spectrum was measured under the following test conditions:

PANalytical X'Pert Pro diffractometer, PIXcel detector
Voltage 45 kV, intensity 40 mA
Incident beam and diffracted beam Soller slits: 0.017 radians
Fixed angle of dispersion slit: ¼ degree
Mask: 10 mm
Scatter prevention slit: ¼ degree
Measurement mode: continuous
Measurement time per step: 3 sec.
Measurement speed: 0.017 degree per second
Measurement step: 0.05 degree (2) Measurement of Average Particle Size (Average Equivalent Spherical Diameter) and Coefficient of Variation The average equivalent spherical diameter and coefficient of variation of the hexagonal ferrite powders obtained in Examples and Comparative Examples were obtained by the methods described above using a model H-9000 transmission electron microscope made by Hitachi as the transmission electron microscope.

(3) Measurement of Saturation Magnetization

The saturation magnetization of the hexagonal ferrite powders obtained in Examples and Comparative Examples were measured at a magnetic field strength of 1194 kA/m (15 kOe) with a vibrating sample magnetometer (made by Toei-Kogyo Co., Ltd.).

The above results are given in Table 1 further below.

2. Fabrication and Evaluation of Magnetic Recording Media (Magnetic Tape)

The hexagonal ferrite powders (ferromagnetic powders) prepared in Examples and Comparative Examples were used to fabricate magnetic tapes by the following method.

(1) Formula of Magnetic Layer Coating Liquid
Hexagonal ferrite powder: 100 parts
Polyurethane resin: 12 parts
  Weight average molecular weight: 10,000
  Content of sulfonic acid functional groups: 0.5 meq/g
Diamond particles (average particle size: 50 nm): 2 parts
Carbon black (#55, average particle size: 0.015 μm, made by Asahi Carbon): 0.5 part
Stearic acid: 0.5 part
Butyl stearate: 2 parts
Methyl ethyl ketone: 180 parts
Cyclohexanone: 100 parts (2) Formula of Nonmagnetic Layer Coating Liquid
Nonmagnetic powder α-iron oxide: 100 parts
  Average particle size: 0.09 μm
  Specific surface area by BET method: 50 m²/g
  pH 7
  DBP oil absorption capacity: 27 to 38 g/100 g
  Surface treatment agent $Al_2O_3$: 8 weight percent
Carbon black (Conductex SC-U, made by Columbia Carbon): 25 parts
Vinyl chloride copolymer (MR104, made by Zeon Corp.): 13 parts
Polyurethane resin (UR8200, made by Toyobo): 5 parts
Phenyl 1 phosphonic acid: 3.5 parts
Butyl stearate: 1 part
Stearic acid: 2 parts
Methyl ethyl ketone: 205 parts
Cyclohexanone: 135 parts (3) Fabrication of Magnetic Tape The various components of each of the above coating liquids were kneaded in kneaders. The liquid was fed by pump to a horizontal sand mill filled to 65 percent of the volume of the dispersing element with 1.0 mm φ zirconia beads and dispersed for 120 minutes (actual residence time in dispersing element) at 2,000 rpm. To the dispersion obtained, 6.5 parts of polyisocyanate were added in the case of the nonmagnetic layer coating liquid, followed by 7 parts of methyl ethyl ketone. The mixture was then filtered with a filter having an average pore diameter of 1 μm to prepare a nonmagnetic layer coating liquid and a magnetic layer coating liquid.

The nonmagnetic layer coating liquid obtained was coated and dried to a thickness of 1.0 μm on a polyethylene naphthalate base 5 μm in thickness, followed by application of the magnetic layer coating liquid in a manner calculated to yield a magnetic layer thickness of 70 nm upon drying in a sequential multilayer coating. Following drying, processing was conducted with a seven-stage calendar at a temperature of 90° C. and a linear pressure of 300 kg/cm. The product was slit to ¼ inch width and surface polished, yielding a magnetic tape.

<Evaluation Methods>

SNR Evaluation

The reproduction output, noise, and SNR of each of the tapes were measured with a reproduction GMR head mounted on a drum tester after recording a signal at a linear recording density of 400 Kbpi (surface recording density of 6.4 Gbpsi) at a track density of 16 KTPI. The measurement values for Comparative Example 1 served as a reference.

The results of the above are given in Table 1.

TABLE 1

| | Reducing compound | Amount of reducing compound added (per 100 mole parts of divalent metal salt + iron salt) | Organic compound | Average particle size (average equivalent spherical diameter) | Coefficient of variation in particle size | Result of X-ray diffraction analysis | Saturation magnetization $\sigma s$ $A \cdot m^2/kg$ | SNR |
|---|---|---|---|---|---|---|---|---|
| Ex. 1 | Hydrazine | 60 mole parts | Oleic acid | 19 nm | 32% | $BaFe_{12}O_{19}$ | 52 | +1.8 dB |
| Ex. 2 | Hydrazine | 10 mole parts | Oleic acid | 23 nm | 30% | $BaFe_{12}O_{19}$ | 51 | +1.7 dB |
| Ex. 3 | Hydrazine | 5 mole parts | Oleic acid | 23 nm | 30% | $BaFe_{12}O_{19}$ | 50 | +1.6 dB |
| Ex. 4 | Hydrazine | 100 mole parts | Oleic acid | 18 nm | 33% | $BaFe_{12}O_{19}$ | 52 | +2.0 dB |
| Ex. 5 | Hydrazine | 200 mole parts | Oleic acid | 18 nm | 33% | $BaFe_{12}O_{19}$ | 52 | +2.0 dB |
| Ex. 6 | Hydrazine | 2 mole parts | Oleic acid | 23 nm | 30% | $BaFe_{12}O_{19}$ | 49 | +1.6 dB |
| Ex. 7 | Hydrazine | 250 mole parts | Oleic acid | 18 nm | 37% | $BaFe_{12}O_{19}$ | 45 | +0.9 dB |
| Comp. Ex. 1 | None | None | Oleic acid | 32 nm | 51% | $BaFe_{12}O_{19}$ | 32 | ±0.0 dB (Reference) |
| Comp. Ex. 2 | Hydrazine | 60 mole parts | None | 108 nm | 65% | $BaFe_{12}O_{19}$ | 50 | −1.3 dB |
| Ex. 8 | Hydrazine | 60 mole parts | Oleic acid | 18 nm | 32% | $SrFe_{12}O_{19}$ | 57 | +2.5 dB |
| Ex. 9 | trimethylamine | 60 mole parts | Oleic acid | 46 nm | 30% | $BaFe_{12}O_{19}$ | 53 | +1.0 dB |
| Ex. 10 | Triethanolamine | 60 mole parts | Oleic acid | 38 nm | 33% | $BaFe_{12}O_{19}$ | 53 | +1.1 dB |

Evaluation Results

As shown in Table 1, The hexagonal ferrite powders obtained in Examples 1 to 8, in which reducing inorganic compounds in the form of hydrazine and oleic acid were employed in combination, and the hexagonal ferrite powders obtained in Examples 9 and 10, in which a reducing organic compound in the form of triethylamine or triethanolamine was employed, were smaller in size and exhibited higher saturation magnetization than the hexagonal ferrite powders obtained in Comparative Examples 1 and 2. Magnetic recording media with magnetic layers containing the hexagonal ferrite powders obtained in Examples 1 to 10 were also found to exhibit excellent electromagnetic characteristics (a high SNR).

As set forth above, it has conventionally been difficult to achieve both particle size reduction and enhanced saturation magnetization in hexagonal ferrite powders. By contrast, as shown in Table 1, it is now possible to achieve both particle size reduction and saturation magnetization in hexagonal ferrite powder.

As shown in Table 1, the hexagonal ferrite powders obtained in Examples 1 to 10 also afforded excellent uniformity of particle size.

The present invention is useful in a field of manufacturing magnetic recording media for high-density recording.

Although the present invention has been described in considerable detail with regard to certain versions thereof, other versions are possible, and alterations, permutations and equivalents of the version shown will become apparent to those skilled in the art upon a reading of the specification and study of the drawings. Also, the various features of the versions herein can be combined in various ways to provide additional versions of the present invention. Furthermore, certain terminology has been used for the purposes of descriptive clarity, and not to limit the present invention. Therefore, any appended claims should not be limited to the description of the preferred versions contained herein and should include all such alterations, permutations, and equivalents as fall within the true spirit and scope of the present invention.

Having now fully described this invention, it will be understood to those of ordinary skill in the art that the methods of the present invention can be carried out with a wide and equivalent range of conditions, formulations, and other parameters without departing from the scope of the invention or any Examples thereof.

All patents and publications cited herein are hereby fully incorporated by reference in their entirety. The citation of any publication is for its disclosure prior to the filing date and should not be construed as an admission that such publication is prior art or that the present invention is not entitled to antedate such publication by virtue of prior invention.

What is claimed is:

1. A method of manufacturing hexagonal ferrite powder, which comprises:
   preparing a hexagonal ferrite precursor-containing water-based solution by:
   mixing an iron salt, a divalent metal salt, a reducing compound, and a base in a water-based solvent, wherein the reducing compound is selected from the group consisting of a reducing inorganic compound and a reducing organic compound that have a reducing property and exist as a solid or a liquid at ordinary temperature and ordinary pressure to prepare a first solution,
   mixing the first solution and a second solution which contains an organic compound other than the reducing organic compound; and
   heating to equal to or higher than 300° C. and pressurizing to equal to or higher than 20 MPa the hexagonal ferrite precursor-containing water-based solution, to convert the precursor to hexagonal ferrite.

2. The method of manufacturing hexagonal ferrite powder according to claim 1, wherein, in the mixing, the reducing compound is mixed in an amount ranging from 2 mole parts to 300 mole parts per 100 mole parts of a combined amount of the iron salt and the divalent metal salt.

3. The method of manufacturing hexagonal ferrite powder according to claim 1, wherein the reducing compound comprises at least a reducing organic compound that has a reducing property and exists as a solid or a liquid at ordinary temperature and ordinary pressure.

4. The method of manufacturing hexagonal ferrite powder according to claim 1, wherein the reducing compound comprises at least a reducing inorganic compound that has a reducing property and exists as a solid or a liquid at ordinary temperature and ordinary pressure.

5. The method of manufacturing hexagonal ferrite powder according to claim 1, wherein the reducing compound comprises at least a hydrazine compound.

6. The method of manufacturing hexagonal ferrite powder according to claim 5, wherein the hydrazine compound is hydrazine.

7. The method of manufacturing hexagonal ferrite powder according to claim 1, wherein the reducing compound comprises at least an amine compound.

8. The method of manufacturing hexagonal ferrite powder according to claim 7, wherein the amine compound is triethylamine.

9. The method of manufacturing hexagonal ferrite powder according to claim 7, wherein the amine compound is triethanolamine.

10. The method of manufacturing hexagonal ferrite powder according to claim 1, wherein the organic compound is selected from the group consisting of an organic carboxylic acid and a salt thereof.

11. The method of manufacturing hexagonal ferrite powder according to claim 1, wherein a flow passage continuously feeding the precursor solution and a flow passage continuously feeding the organic compound solution are converged to mix the precursor solution and organic compound solution.

12. The method of manufacturing hexagonal ferrite powder according to claim 1, wherein a mixed solution of the precursor solution and organic compound solution is mixed with water that has been heated and pressurized, and then fed to a reaction flow passage within which a fluid flowing therein is subjected to heating to equal to or higher than 300° C. and pressurizing to equal to or higher than 20 MPa to convert the precursor to hexagonal ferrite.

13. The method of manufacturing hexagonal ferrite powder according to claim 12, wherein the flow passage within which the mixed solution is being continuously fed and a flow passage within which heated and pressurized water is being continuously fed are converged to mix the mixed solution with heated and pressurized water.

14. The method of manufacturing hexagonal ferrite powder according to claim 1, wherein the hexagonal ferrite that is obtained by the conversion of the precursor is selected from the group consisting of barium ferrite, strontium ferrite, and a mixed crystal thereof.

* * * * *